United States Patent
Mayrench et al.

(10) Patent No.: US 9,596,017 B1
(45) Date of Patent: *Mar. 14, 2017

(54) TRANSMISSION-MODE-AWARE RATE MATCHING IN MIMO SIGNAL GENERATION

(71) Applicant: Marvell International Ltd., Hamilton (BM)

(72) Inventors: Ronen Mayrench, Ra'anana (IL); Ezer Melzer, Tel Aviv (IL)

(73) Assignee: MARVELL INTERNATIONAL LTD., HAMILTON (BM)

( * ) Notice: Subject to any disclaimer, the term of this patent is extended or adjusted under 35 U.S.C. 154(b) by 79 days.

This patent is subject to a terminal disclaimer.

(21) Appl. No.: 14/571,314

(22) Filed: Dec. 16, 2014

Related U.S. Application Data

(63) Continuation of application No. 12/903,237, filed on Oct. 13, 2010, now Pat. No. 8,917,796.

(60) Provisional application No. 61/252,991, filed on Oct. 19, 2009.

(51) Int. Cl.
*H04L 27/00* (2006.01)
*H04B 7/06* (2006.01)
*H04W 72/04* (2009.01)
*H04B 7/04* (2006.01)

(52) U.S. Cl.
CPC ......... *H04B 7/0697* (2013.01); *H04B 7/0413* (2013.01); *H04W 72/04* (2013.01)

(58) Field of Classification Search
CPC ....... H04L 1/06; H04L 1/1893; H04B 7/0413; H04B 7/02; H04B 7/0486

USPC ................ 375/130–133, 140–153, 259–285, 375/295–302, 316–325, 340–343, 375/346–350

See application file for complete search history.

(56) References Cited

U.S. PATENT DOCUMENTS

| | | | | |
|---|---|---|---|---|
| 7,526,039 B2* | 4/2009 | Kim | ................ | H04L 1/0618 375/259 |
| 7,593,486 B2* | 9/2009 | Jeong | ................ | H04B 7/0689 375/260 |
| 7,924,958 B2* | 4/2011 | Hwang | ................ | H04B 7/0669 375/138 |
| 7,944,985 B2* | 5/2011 | ElGamal | ................ | H04L 1/0003 375/267 |
| 7,953,169 B2* | 5/2011 | Lee | ................ | H04B 7/0678 375/260 |

(Continued)

*Primary Examiner* — James M Perez

(57) ABSTRACT

A method in a Multiple-Input Multiple-Output (MIMO) transmitter includes selecting a transmission mode from a group of modes including a spatial multiplexing mode and a transmit diversity mode. A rate matching parameter is set depending on at least the selected transmission mode. Data for transmission is formatted in one or more transport blocks, each transport block including multiple code blocks having respective lengths, in symbols, that are respective integer multiples of the rate matching parameter. The code blocks of a given transport block are mapped onto time-frequency resource elements in accordance with the selected transmission mode, such that each resource element contains data originating from only a respective one of the code blocks of the given transport block. The code blocks of the given transport block are transmitted over the time-frequency resource elements to a receiver.

18 Claims, 2 Drawing Sheets

(56) References Cited

U.S. PATENT DOCUMENTS

| | | | | |
|---|---|---|---|---|
| 8,098,776 B2* | 1/2012 | Kent | H04B 7/0697 | 375/141 |
| 8,160,177 B2* | 4/2012 | Zhang | H04L 1/0606 | 375/299 |
| 8,325,844 B2* | 12/2012 | Walton | H04B 7/0417 | 375/130 |
| 8,345,732 B2* | 1/2013 | Fischer | H04B 7/0617 | 375/219 |
| 8,537,750 B2* | 9/2013 | Jin | H04L 27/0008 | 370/328 |
| 8,553,624 B2* | 10/2013 | Khan | H04B 7/0413 | 370/329 |
| 8,634,366 B2* | 1/2014 | Kim | H04L 1/0042 | 370/320 |
| 8,908,784 B2* | 12/2014 | Nammi | H04L 25/03929 | 370/206 |
| 8,917,796 B1* | 12/2014 | Mayrench | H04L 5/006 | 375/260 |
| 9,124,325 B2* | 9/2015 | Hoshino | H04L 1/1893 | |
| 9,214,992 B2* | 12/2015 | Nammi | H04L 25/03929 | |
| 2003/0128658 A1* | 7/2003 | Walton | H04L 1/06 | 370/208 |
| 2005/0152473 A1* | 7/2005 | Maltsev | H04L 27/26 | 375/299 |
| 2005/0276317 A1* | 12/2005 | Jeong | H04B 7/0689 | 375/213 |
| 2006/0114858 A1* | 6/2006 | Walton | H04B 7/0417 | 370/335 |
| 2006/0198460 A1* | 9/2006 | Airy | H04B 7/04 | 375/267 |
| 2007/0183529 A1* | 8/2007 | Tujkovic | H04B 7/0413 | 375/267 |
| 2007/0274411 A1* | 11/2007 | Lee | H04B 7/0671 | 375/267 |
| 2008/0317146 A1* | 12/2008 | Kwon | H04L 1/0071 | 375/260 |
| 2009/0219911 A1* | 9/2009 | Blankenship | H04L 1/0042 | 370/345 |
| 2010/0287452 A1* | 11/2010 | Xu | H04W 72/04 | 714/786 |
| 2010/0296603 A1* | 11/2010 | Lee | H04L 1/0071 | 375/295 |
| 2010/0303016 A1* | 12/2010 | Jin | H04L 27/0008 | 370/328 |
| 2011/0261775 A1* | 10/2011 | Kim | H04L 1/0042 | 370/329 |
| 2012/0002657 A1* | 1/2012 | Seyama | H04L 1/1854 | 370/338 |
| 2012/0033630 A1* | 2/2012 | Chung | H04B 7/0473 | 370/329 |
| 2013/0077703 A1* | 3/2013 | Kotecha | H04L 1/06 | 375/267 |
| 2013/0094349 A1* | 4/2013 | Hoshino | H04L 1/1893 | 370/216 |
| 2013/0145239 A1* | 6/2013 | Pi | H04L 1/0003 | 714/807 |
| 2013/0148614 A1* | 6/2013 | Noh | H04L 5/001 | 370/329 |
| 2014/0086351 A1* | 3/2014 | Nammi | H04L 25/03929 | 375/267 |
| 2015/0063502 A1* | 3/2015 | Nammi | H04L 25/03929 | 375/340 |

\* cited by examiner

TRANSMISSION-MODE-AWARE RATE MATCHING IN MIMO SIGNAL GENERATION

CROSS-REFERENCE TO RELATED APPLICATIONS

This application is a continuation of U.S. patent application Ser. No. 12/903,237, filed Oct. 13, 2010, which claims the benefit of U.S. Provisional Patent Application 61/252,991, filed Oct. 19, 2009. The disclosures of these related applications are incorporated herein by reference.

FIELD OF THE DISCLOSURE

The present disclosure relates generally to communication systems, and particularly to Multiple-Input Multiple-Output (MIMO) transmission.

BACKGROUND

Some communication systems transmit data from a transmitter to a receiver over multiple communication channels, using multiple transmit antennas and multiple receive antennas. Multiple-channel transmission is used, for example, in spatial multiplexing schemes that achieve high throughput and in spatial diversity schemes that achieve high resilience against channel fading and multipath. These schemes are often referred to collectively as Multiple-Input Multiple-Output (MIMO) schemes.

MIMO schemes are used, for example, in Evolved Universal Terrestrial Radio Access (E-UTRA) systems, also referred to as Long Term Evolution (LTE) systems. The Third Generation Partnership Project (3GPP) E-UTRA standards specify MIMO schemes for use by E-UTRA User Equipment (UE) and base stations (eNodeB). These schemes are described, for example, in 3GPP Technical Specification 36.211, entitled "Technical Specification Group Radio Access Network; Evolved Universal Terrestrial Radio Access (E-UTRA); Physical Channels and Modulation (Release 8)," (3GPP TS 36.211), version 8.9.0, December, 2009; and in 3GPP Technical Specification 36.212, entitled "Technical Specification Group Radio Access Network; Evolved Universal Terrestrial Radio Access (E-UTRA); Multiplexing and Channel Coding (Release 8)," (3GPP TS 36.212), version 8.8.0, December 2009, which are incorporated herein by reference. In particular, section 5.1.4 of the TS 36.212 specification describes rate matching for LTE transport channels.

The 3GPP is currently in the process of specifying an extension of the E-UTRA specification, which is referred to as LTE-Advanced (LTE-A). The evolving LTE specifications contemplate MIMO transmission using up to eight transmit antenna ports. LTE-A schemes are described, for example, in 3GPP Technical Report TR 36.814, entitled "Technical Specification Group Radio Access Network; Evolved Universal Terrestrial Radio Access (E-UTRA); Further advancements for E-UTRA physical layer aspects (Release 9)," (3GPP TR 814), version 9.0.0, March, 2010, which is incorporated herein by reference. Chapter 7 of this technical report describes downlink MIMO transmission schemes for use in LTE-A systems.

The description above is presented as a general overview of related art in this field and should not be construed as an admission that any of the information it contains constitutes prior art against the present patent application.

SUMMARY

An embodiment that is described herein provides a method in a Multiple-Input Multiple-Output (MIMO) transmitter. The method includes selecting a transmission mode from a group of modes including a spatial multiplexing mode and a transmit diversity mode. A rate matching parameter is set depending on at least the selected transmission mode. Data for transmission is formatted in one or more transport blocks, each transport block including multiple code blocks having respective lengths, in symbols, that are respective integer multiples of the rate matching parameter. The code blocks of a given transport block are mapped onto time-frequency resource elements in accordance with the selected transmission mode, each resource element corresponding to a respective frequency range that is allocated for a given transmission over a specified time interval, such that each resource element contains data originating from only a respective one of the code blocks of the given transport block. The code blocks of the given transport block are transmitted over the time-frequency resource elements to a receiver.

In some embodiments, mapping the code blocks onto the resource elements includes mapping the code blocks onto a number of spatial layers, and mapping the spatial layers onto the resource elements. In an embodiment, setting the rate matching parameter includes choosing the rate matching parameter depending on the number of the spatial layers. In another embodiment, setting the rate matching parameter includes fixing the rate matching parameter to be equal to the number of the spatial layers when the number of the spatial layers is between one and three. In yet another embodiment, when the number of the spatial layers is four, setting the rate matching parameter includes fixing the rate matching parameter to be two when the selected transmission mode is the transmit diversity mode, and fixing the rate matching parameter to be four when the selected transmission mode is the spatial multiplexing mode.

In a disclosed embodiment, setting the rate matching parameter includes indicating the rate matching parameter to the receiver by signaling at least the selected transmission mode from the transmitter to the receiver. In another embodiment, setting the rate matching parameter includes reporting the rate matching parameter from the transmitter to the receiver. In some embodiments, transmitting the MIMO signal includes transmitting the signal in accordance with a Long Term Evolution Advanced (LTE-A) specification.

There is additionally provided, in accordance with an embodiment that is described herein, a MIMO transmitter including a controller, a rate matching unit, a mapping unit and transmission circuitry. The controller is configured to select a transmission mode from a group of modes including a spatial multiplexing mode and a transmit diversity mode. The rate matching unit is configured to set a rate matching parameter depending on at least the selected transmission mode, and to format data for transmission in one or more transport blocks, each transport block including multiple code blocks having respective lengths, in symbols, that are respective integer multiples of the rate matching parameter. The mapping unit is configured to map the code blocks of a given transport block onto time-frequency resource elements in accordance with the selected transmission mode, each resource element corresponding to a respective frequency range that is allocated for a given transmission over a specified time interval, such that each resource element contains data originating from only a respective one of the code blocks of the given transport block. The transmission circuitry is configured to transmit the code blocks of the given transport block in a MIMO signal over the time-frequency resource elements to a receiver.

There is further provided, in accordance with an embodiment that is described herein, a system including a MIMO transmitter and a receiver. The transmitter is configured to select a transmission mode from a group of modes including a spatial multiplexing mode and a transmit diversity mode, to set a rate matching parameter depending on at least the selected transmission mode, to format data for transmission in one or more transport blocks, each transport block including multiple code blocks having respective lengths, in symbols, that are respective integer multiples of the rate matching parameter, to map the code blocks of a given transport block onto time-frequency resource elements in accordance with the selected transmission mode, each resource element corresponding to a respective frequency range that is allocated for a given transmission over a specified time interval, such that each resource element contains data originating from only a respective one of the code blocks of the given transport block, and to transmit the code blocks of the given transport block in a MIMO signal over the time-frequency resource elements. The receiver is configured to receive the MIMO signal from the transmitter and to decode the code blocks based on the rate matching parameter. In some embodiments, the transmitter is configured to transmit to the receiver signaling that is indicative of the rate matching parameter, and the receiver is configured to determine the rate matching parameter based on the signaling.

The present disclosure will be more fully understood from the following detailed description of the embodiments thereof, taken together with the drawings in which:

DETAILED DESCRIPTION OF EMBODIMENTS

Figure 1:
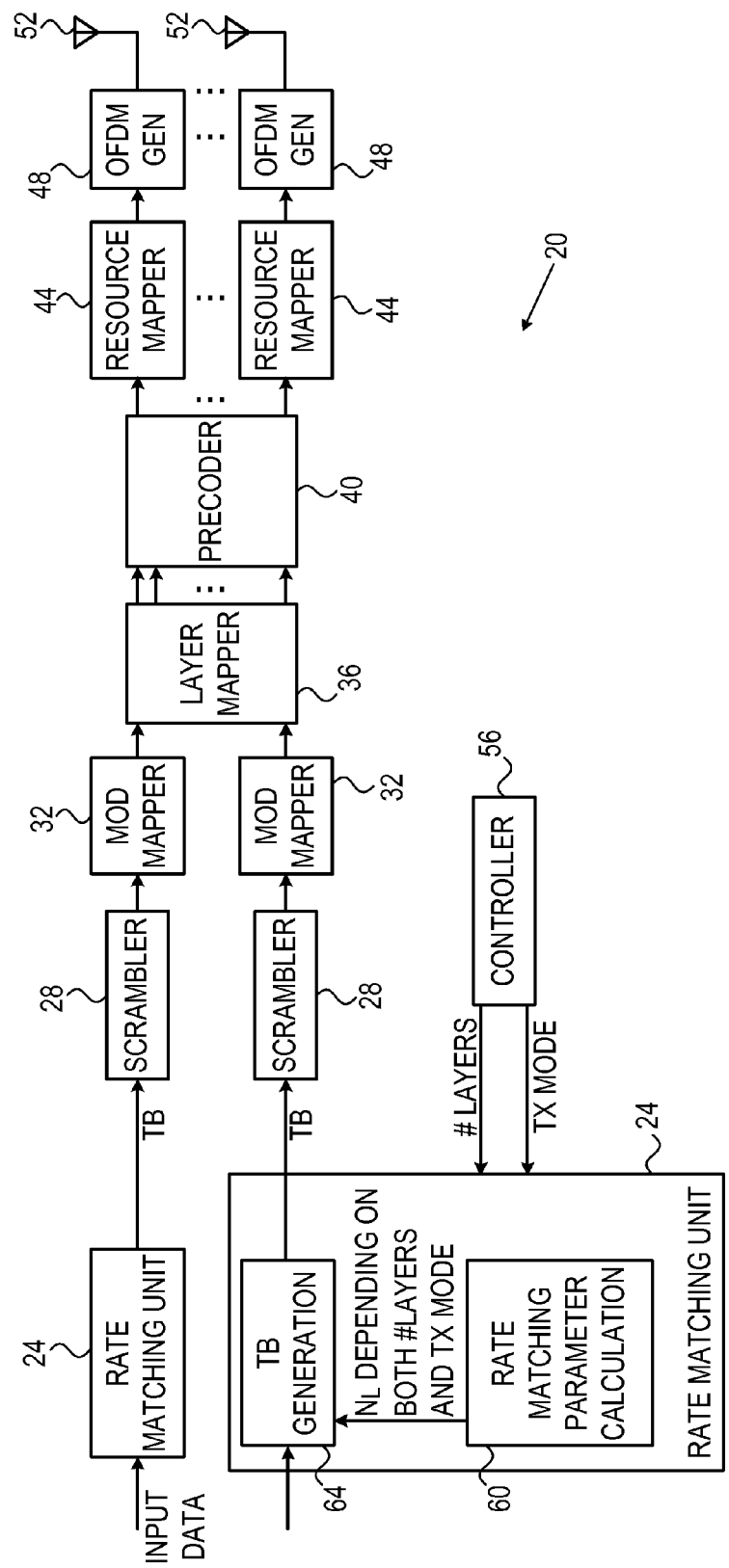
FIG. 1 is a block diagram that schematically illustrates a MIMO transmitter, in accordance with an embodiment that is described herein.

In some known MIMO schemes, for example, a transmitter generates one or more Transport Blocks (TBs), such that each TB is divided into multiple Code Blocks (CBs). The transmitter then converts the bits of each TB into modulated symbols, and maps the modulated symbols onto spatial layers, i.e., onto signals that carry the symbols and are to be transmitted to a receiver over different MIMO transmission channels. The transmitter applies a precoding operation to map each spatial layer onto a respective set of transmit antenna ports. The transmitter allocates a set of time-frequency bins, referred to as Resource Elements (REs) in E-UTRA terminology, for transmission to a certain receiver.

The transmitter may transmit MIMO signals using various MIMO transmission modes, such as spatial multiplexing and transmit diversity. Transmission modes used in E-UTRA systems are described, for example, in section 7.1 of 3GPP Technical Specification 36.213, entitled "Technical Specification Group Radio Access Network; Evolved Universal Terrestrial Radio Access (E-UTRA); Physical Layer Procedures (Release 8)," (3GPP TS 36.213), version 8.6.0, March, 2009, which is incorporated herein by reference. A transmission process of this sort, as performed in the downlink of an E-UTRA eNodeB, is described in detail in chapter 6 of the 3GPP TS 36.211 specification, cited above. A similar process, as contemplated for use in LTE-A eNodeB, is described in chapter 7 of the 3GPP TR 36.814 technical report, cited above.

In embodiments of the present disclosure, a transmitter is configured to ensure that bits from different Code Blocks (CBs) in a given Transport Block (TB) are not mapped onto the same Resource Element (RE). In other words, each RE is to contain symbols that originate from only a single CB in a given TB. A scheme of this sort, for example, enables the receiver to process each RE independently. Embodiments that are described herein provide methods and systems for producing CBs and TBs that meet the above-described condition.

In some embodiments, a rate matching unit in the transmitter accepts input data for transmission in a given TB, and produces the CBs that make-up this TB. The TB in question is to be mapped onto a certain number of spatial layers and transmitted using a certain transmission mode (spatial multiplexing or transmit diversity). The rate matching unit selects a rate matching parameter, denoted $N_L$, which depends on the number of spatial layers and on the transmission mode of the transmitter.

In an embodiment, the rate matching unit then formats the input data in CBs, such that the length of each CB (in symbols) is an integer multiple of the rate matching parameter $N_L$. The TB that is produced in this manner is then mapped onto the designated number of spatial layers and transmitted using the designated transmission mode.

The signal generation techniques described herein comply with the condition that each RE contains symbols originating from only a single CB in a given TB. Moreover, the CBs that are produced using these techniques have a relatively small variance in length within each TB. These features simplify processing both in the transmitter and in the receiver, and therefore reduce system cost and complexity. The disclosed techniques can also improve communication link performance in comparison with conventional signal generation schemes, since they enable highly accurate link adaptation: Smaller variance in the CB lengths enables the transmitter to better match the code rates (which in turn depend on the CB lengths) to the channel quality.

The methods and systems described herein are particularly useful in MIMO systems having a large number of transmit antenna ports, such as in LTE-A systems. A specific signal generation scheme for LTE-A systems, which is backward-compatible to legacy LTE systems, is described. Generally, however, the disclosed techniques can be used in various other MIMO applications.

FIG. 1 is a block diagram that schematically illustrates a MIMO transmitter 20, in accordance with an embodiment that is described herein. The description that follows refers to a transmitter of an LTE-Advanced (LTE-A) base station (eNodeB), although the methods and systems described herein can be used in transmitters operating in accordance with any other suitable communication standard or protocol, such as LTE, IEEE 802.16 (also referred to as WiMAX), for example. Although the description that follows refers mainly to downlink transmission from the eNodeB to the UE, the disclosed methods and systems may be applicable to uplink transmission, as well.

Transmitter 20 comprises one or more modulation chains, each comprising a rate matching unit 24, a scrambler 28 and a modulation mapper 32. Input data for transmission is encoded with an Error Correction Code (ECC) using a respective ECC encoder (not shown in the figure) to produce code words. In an embodiment, the number of code words can be one or more and may depend on the number of input bits. Each code word is rate-matched by puncturing in a respective rate matching unit 24, resulting in a Code Block (CB). Consequently, within a given Transmission Time Interval (TTI), each rate matching unit 24 produces a Transport Block (TB) comprising multiple CBs, using methods that are described in detail further below.

The TBs produced by each rate matching unit 24 are scrambled by a respective scrambler 28, and then modulated by a respective modulation mapper 32. Each modulation mapper produces a stream of complex-valued modulated symbols. Any suitable modulation scheme, such as Quadrature Phase Shift Keying (QPSK) or Quadrature Amplitude Modulation (QAM), can be used.

A layer mapper 36 maps the modulated symbol streams produced by modulation mappers 32 onto one or more spatial layers. In an embodiment, the layer mapper maps one or two TBs onto one or more spatial layers. (For a given set of time and frequency resources allocated to a certain communication channel, the multiple transmit and receive antennas add a "spatial" dimension to these resources. One of the possibilities to exploit the additional spatial dimension is by increasing the number of independent modulated symbols transmitted per time-frequency resource. The factor of increase, relative to the case of a single transmit antenna and a single receive antenna, is defined as the number of spatial layers.) Each spatial layer comprises a stream of complex values, which are to be subsequently transmitted over the MIMO communication channel.

The mapped spatial layers are provided to a precoder 40. Precoder 40 maps the spatial layers onto transmit antenna ports 52 of the transmitter according to a certain precoding scheme. (Note that a given antenna port may not necessarily correspond to a single physical antenna, but may correspond to a "virtual antenna" whose transmitted signal is generated—in a manner that the receiver need not necessarily be aware of—as a superposition (a weighted sum) of the signals stemming from a number of physical antennas. The number of transmit antenna ports may be larger than the number of layers.) In the present example, transmitter 20 comprises eight transmit antenna ports, although any other suitable number of transmit antenna ports can also be used.

Resource mappers 44 allocate Resource Elements (REs) to the respective transmit antenna ports. Each RE corresponds to a respective frequency range (a.k.a. bin) that is allocated for a given transmission over a specified time interval. The outputs of mappers 44 are processed by respective Orthogonal Frequency Division Multiplexing (OFDM) generators 48, which produce OFDM signals that are transmitted via transmit antenna ports 52 toward the receiver.

Transmitter 20 comprises a controller 56, which configures and controls the different transmitter elements. In particular, controller 56 assigns the desired number of spatial layers, and the desired transmission mode (spatial multiplexing or transmit diversity) to be used in a given transmission. Processor 56 provides this information to rate matching units 24 for use in producing the CBs and TBs.

In an embodiment, for a given modulation chain, rate matching unit 24 formats the ECC-encoded input data in a TB comprising multiple CBs. The number of bits may differ from one CB to another in a given TB. Nevertheless, in an embodiment, the length of each CB (measured in terms of modulated symbols) is set to an integer multiple of a certain rate matching parameter $N_L$, which depends on the number of spatial layers and the transmission mode.

In an example embodiment, rate matching unit 24 comprises a rate matching parameter calculation module 60, which selects the value of $N_L$ depending on the number of spatial layers and the transmission mode that are indicated by controller 56. A TB generation module 64 formats the encoded input data in CBs, in accordance with the rate matching parameter selected by module 60. TB generation module 64 outputs the resulting TB to the respective scrambler 28. In FIG. 1, this example internal structure is shown for only one of the rate matching units, for the sake of clarity and to avoid obfuscating the teachings of the present disclosure. In an embodiment, the other rate matching unit 24 has a similar structure.

The transmitter configuration shown in FIG. 1 is a simplified example configuration, which is depicted solely for the sake of conceptual clarity. In alternative embodiments, any other suitable transmitter configuration can also be used. In some embodiments, scramblers 28, modulation mappers 32, layer mapper 36, precoder 40 and resource mapper 44 are regarded herein collectively as a mapping unit, which maps the CBs generated by rate matching unit 24 onto REs in accordance with the selected MIMO transmission mode such that any given RE has symbols originating from a single CB of a given TB. The functions of the mapping unit elements can be partitioned in any other suitable manner.

The different components of transmitter 20, including, for example, modules 60 and 64 of unit 24 and controller 56, may be implemented using hardware, such as using one or more Application-Specific Integrated Circuits (ASICs) and/or Field-Programmable Gate Arrays (FPGAs). Alternatively, some transmitter components may be implemented using software executing on a hardware device, or using a combination of hardware and software elements. In some embodiments, controller 56 comprises a programmable processor, which is programmed in software to carry out the functions described herein, although it too may be implemented in hardware. The software may be downloaded to the processor in electronic form, over a network, for example, or it may, alternatively or additionally, be provided and/or stored on tangible media, such as magnetic, optical, or electronic memory. In some embodiments, some or all of the elements of transmitter 20 may be fabricated in a chip-set. Transmitter elements that are not mandatory for explanation of the disclosed techniques, such as various Radio Frequency (RF) elements, have been omitted from FIG. 1 for the sake of clarity.

In some embodiments, rate matching unit 24 sets the length of each CB such that (after subsequent layer mapping, precoding and resource mapping) bits from different CBs in a given TB will not be mapped to the same RE. In other words, unit 24 is configured so that each RE has bits originating from a single CB of the given TB. Unit 24 achieves this goal by setting the length of each CB (in modulated symbols) to be an integer multiple of a rate matching parameter $N_L$, which depends on the number of spatial layers and on the transmission mode.

In an embodiment, module 60 in rate matching unit 24 selects $N_L$ in accordance with the following table:

TABLE 1

Example $N_L$ selection scheme

| # of spatial layers | Transmission mode | Selected $N_L$ |
|---|---|---|
| 1 | Any | 1 |
| 2 | Any | 2 |
| 3 | Any | 3 |

TABLE 1-continued

Example $N_L$ selection scheme

| # of spatial layers | Transmission mode | Selected $N_L$ |
|---|---|---|
| 4 | Transmit diversity | 2 |
| 4 | Spatial multiplexing | 4 |

The example of Table 1 refers to an LTE-A eNodeB with eights transmit antenna ports, in which each TB is mapped onto up to four spatial layers. As can be seen in the table, the selected value of $N_L$ in the case of four spatial layers differs depending on the applicable transmission mode ($N_L$=2 for transmit diversity, $N_L$=4 for spatial multiplexing). The selection scheme seen in table 1 is backward-compatible with legacy LTE systems. The selection scheme of Table 1 is given purely by way of example. In alternative embodiments, module 60 may use any other suitable scheme for selecting $N_L$ depending on the number of spatial layers and the transmission mode.

In some embodiments, rate matching unit 24 sets the CB lengths as follows: Let G denote the total number of bits to be transmitted in a given TB. Let C denote the number of CBs in the TB. Let E denote the number of bits to be transmitted in the $r^{th}$ CB in the TB, $1 \leq r \leq C$, as produced at the output of rate matching unit 24. (E may differ from one CB to another, i.e., it may depend on r.) Let $Q_m$ denote on the modulation order (number of bits per symbol) of the modulation scheme used for modulating the MIMO signal. In the present example, $Q_m$=2 for QPSK, $Q_m$=4 for sixteen-symbol QAM (16-QAM) and $Q_m$=6 for sixty-four-symbol QAM (64-QAM).

In an embodiment, module 64 in rate matching unit 24 sets E, the number of bits in the $r^{th}$ CB, to be:

$$E=N_L \cdot Q_m \cdot \lfloor G'/C \rfloor \text{ for } r \leq C-\gamma-1$$

$$E=N_L \cdot Q_m \cdot \lceil G'/C \rceil \text{ otherwise} \quad \text{Equation 1:}$$

wherein $G'=G/(N_L \cdot Q_m)$, and $\gamma=G'$ mod C. (For $r \leq C-\gamma-1$, the term G'/C is rounded down, while for other values of r the term G'/C is rounded up.) As can be seen in Equation 1, $E/Q_m$ is an integer multiple of $N_L$ for any r (i.e., the length of any CB in modulated symbols is an integer multiple of the rate matching parameter). In alternative embodiments, module 64 may set the length of each CB in any other suitable manner, as long as the length of each CB (in modulated symbols) is an integer multiple of $N_L$.

Figure 2:
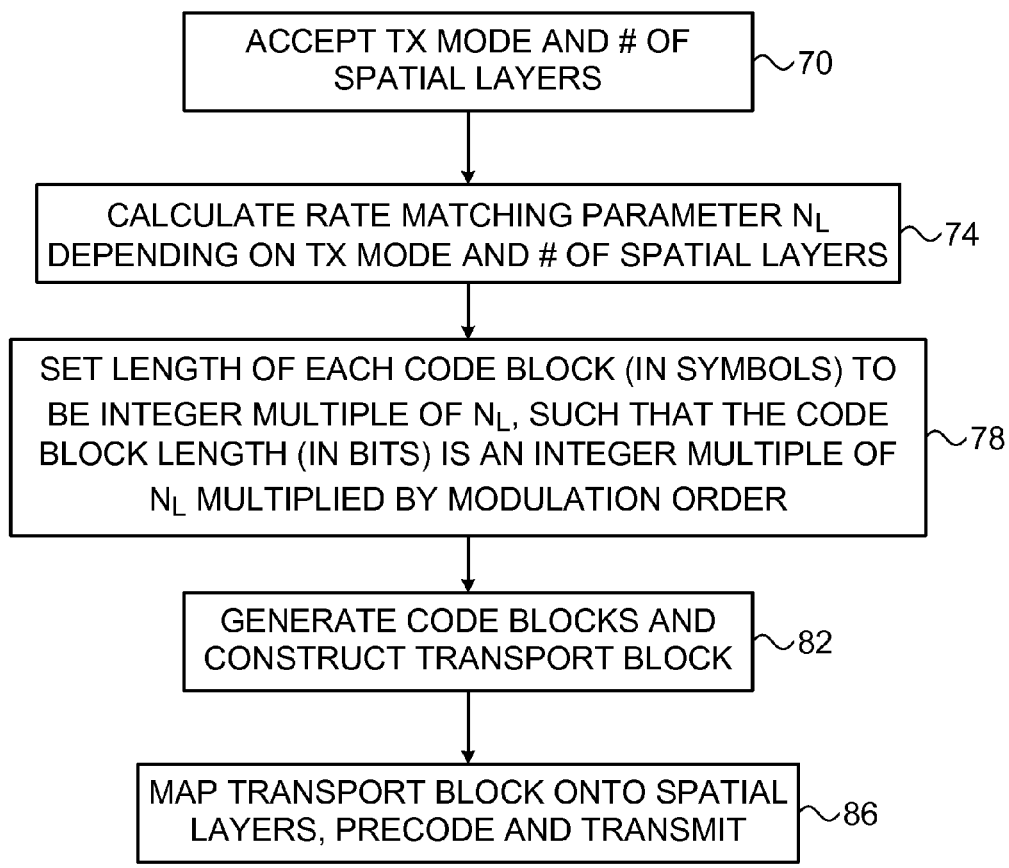
FIG. 2 is a flow chart that schematically illustrates a method for MIMO transmission, in accordance with an embodiment that is described herein.

FIG. 2 is a flow chart that schematically illustrates a method for MIMO transmission, in accordance with an embodiment that is described herein. The method begins with rate matching unit 24 accepting from controller 56 a designated number of spatial layers and a designated transmission mode, at an input operation 70.

Module 60 in unit 24 selects the value of rate matching parameter $N_L$ depending on the designated number of spatial layers and transmission mode, at a parameter selection operation 74. Module 64 in unit 24 sets the length of each CB (in symbols) to be an integer multiple of the selected $N_L$, at a length setting operation 78. In an example embodiment, module 64 sets the length of each CB (in bits) to be an integer multiple of $N_L \cdot Q_m$ in accordance with Equation 1 above. Module 64 generates the CBs of the TB, at a CB generation operation 82. The resulting TB is provided to scrambler 28.

Transmitter 20 processes and transmits the TB, at a transmission operation 86. In an embodiment, scrambler 28 scrambles the bits of the TB, modulation mapper 32 modulates the scrambled bits, layer mapper 36 maps the modulated symbols onto the designated number of spatial streams, precoder 40 precodes the spatial streams, resource mappers 44 map the precoded spatial streams onto REs, and OFDM generators 48 produce appropriate OFDM signals. The OFDM signals are then transmitted via transmit antenna ports 52. In an embodiment, the properly-sized CBs are mapped such that any RE has bits originating from only a single CB in a given TB.

In some embodiments, transmitter 20 signals the selected value of $N_L$ to the receiver, in order to enable the receiver to determine the lengths of the different CBs and successfully decode the TB. In some embodiments, the signaling is explicit, i.e., the transmitter notifies the receiver of the selected value of $N_L$. In alternative embodiments, the signaling of $N_L$ is implicit. In LTE systems, for example, the eNodeB notifies the UE of the transmission mode and the number of spatial layers. In an embodiment, the UE derives the value of $N_L$ from these signals parameters.

Although the embodiments described herein mainly address CB and TB generation in LTE-A systems, the methods and systems described herein can also be used in other applications, such as in WiMAX systems operating in accordance with IEEE 802.16 specifications.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:
1. A method, comprising:
in a Multiple-Input Multiple-Output (MIMO) transmitter, selecting a transmission mode;
setting a rate matching parameter for a given number of spatial layers to a first value when the selected transmission mode is a transmit diversity mode, and setting the rate matching parameter for the given number of the spatial layers to a second value, different from the first value, when the selected transmission mode is not the transmit diversity mode;
formatting data for transmission in one or more transport blocks, each transport block comprising multiple code blocks having respective lengths, in symbols, that are respective integer multiples of the rate matching parameter;
mapping the code blocks of a given transport block onto the given number of the spatial layers and onto time-frequency resource elements in accordance with the selected transmission mode, each resource element corresponding to a respective frequency range that is allocated for a given transmission over a specified time interval, such that each resource element contains data originating from only a respective one of the code blocks of the given transport block; and
transmitting the code blocks of the given transport block in a MIMO signal over the time-frequency resource elements to a receiver.
2. The method according to claim 1, wherein mapping the code blocks onto the resource elements comprises mapping the code blocks onto the given number of the spatial layers, and mapping the spatial layers onto the resource elements.

3. The method according to claim 2, wherein setting the rate matching parameter comprises choosing the rate matching parameter depending on the given number of the spatial layers.

4. The method according to claim 2, wherein setting the rate matching parameter comprises fixing the rate matching parameter to be equal to the given number of the spatial layers when the given number of the spatial layers is between one and three.

5. The method according to claim 2, wherein, when the given number of the spatial layers is four, setting the rate matching parameter comprises fixing the rate matching parameter to be two when the selected transmission mode is the transmit diversity mode, and fixing the rate matching parameter to be four when the selected transmission mode is a spatial multiplexing mode.

6. The method according to claim 1, wherein setting the rate matching parameter comprises indicating the rate matching parameter to the receiver by signaling at least the selected transmission mode from the transmitter to the receiver.

7. The method according to claim 1, wherein setting the rate matching parameter comprises reporting the rate matching parameter from the transmitter to the receiver.

8. The method according to claim 1, wherein transmitting the MIMO signal comprises transmitting the signal in accordance with a Long Term Evolution Advanced (LTE-A) specification.

9. A Multiple-Input Multiple-Output (MIMO) transmitter, comprising:
   a controller, which is configured to select a transmission mode;
   a rate matching unit, which is configured to set a rate matching parameter for a given number of spatial layers to a first value when the selected transmission mode is a transmit diversity mode, to set the rate matching parameter for the given number of the spatial layers to a second value, different from the first value, when the selected transmission mode is not the transmit diversity mode, and to format data for transmission in one or more transport blocks, each transport block comprising multiple code blocks having respective lengths, in symbols, that are respective integer multiples of the rate matching parameter;
   a mapping unit, which is configured to map the code blocks of a given transport block onto the given number of the spatial layers and onto time-frequency resource elements in accordance with the selected transmission mode, each resource element corresponding to a respective frequency range that is allocated for a given transmission over a specified time interval, such that each resource element contains data originating from only a respective one of the code blocks of the given transport block; and
   transmission circuitry, which is configured to transmit the code blocks of the given transport block in a MIMO signal over the time-frequency resource elements to a receiver.

10. The transmitter according to claim 9, wherein the mapping unit is configured to map the code blocks onto the resource elements by mapping the code blocks onto the given number of the spatial layers, and mapping the spatial layers onto the resource elements.

11. The transmitter according to claim 10, wherein the rate matching unit is configured to set the rate matching parameter depending on the given number of the spatial layers.

12. The transmitter according to claim 10, wherein the rate matching unit is configured to fix the rate matching parameter to be equal to the given number of the spatial layers when the number of the spatial layers is between one and three.

13. The transmitter according to claim 10, wherein, when the given number of the spatial layers is four, the rate matching unit is configured to fix the rate matching parameter to be two when the selected transmission mode is the transmit diversity mode, and to fix the rate matching parameter to be four when the selected transmission mode is a spatial multiplexing mode.

14. The transmitter according to claim 9, wherein the rate matching unit is configured to indicate the rate matching parameter to the receiver by signaling at least the selected transmission mode from the transmitter to the receiver using the transmission circuitry.

15. The transmitter according to claim 9, wherein the rate matching unit is configured to report the rate matching parameter from the transmitter to the receiver using the transmission circuitry.

16. The transmitter according to claim 9, wherein the transmission circuitry is configured to transmit the MIMO signal in accordance with a Long Term Evolution Advanced (LTE-A) specification.

17. A system, comprising:
   a Multiple-Input Multiple-Output (MIMO) transmitter, which is configured to select a transmission mode, to set a rate matching parameter for a given number of spatial layers to a first value when the selected transmission mode is a transmit diversity mode, to set the rate matching parameter for the given number of the spatial layers to a second value, different from the first value, when the selected transmission mode is not the transmit diversity mode, to format data for transmission in one or more transport blocks, each transport block comprising multiple code blocks having respective lengths, in symbols, that are respective integer multiples of the rate matching parameter, to map the code blocks of a given transport block onto the given number of the spatial layers and onto time-frequency resource elements in accordance with the selected transmission mode, each resource element corresponding to a respective frequency range that is allocated for a given transmission over a specified time interval, such that each resource element contains data originating from only a respective one of the code blocks of the given transport block, and to transmit the code blocks of the given transport block in a MIMO signal over the time-frequency resource elements; and
   a receiver, which is configured to receive the MIMO signal from the transmitter and to decode the code blocks based on the rate matching parameter.

18. The system according to claim 17, wherein the transmitter is configured to transmit to the receiver signaling that is indicative of the rate matching parameter, and wherein the receiver is configured to determine the rate matching parameter based on the signaling.

* * * * *